United States Patent [19]
Wollbeck et al.

[11] Patent Number: 5,160,673
[45] Date of Patent: Nov. 3, 1992

[54] HOLLOW FIBER MODULE

[75] Inventors: Rudi Wollbeck, Erlenbach; Thomas Zang, Goldbach, both of Fed. Rep. of Germany

[73] Assignee: Akzo N.V., Arnhem, Netherlands

[21] Appl. No.: 665,490

[22] Filed: Mar. 5, 1991

Related U.S. Application Data

[62] Division of Ser. No. 353,068, May 17, 1989.

[30] Foreign Application Priority Data

Nov. 26, 1988 [DE] Fed. Rep. of Germany ....... 3839966

[51] Int. Cl.$^5$ ...................... B01D 67/00; B01D 69/08; D01D 5/24; D01F 1/08
[52] U.S. Cl. ................................. 264/45.1; 425/472
[58] Field of Search ........... 210/321.8, 500.23, 321.78, 210/321.79, 321.87, 321.88, 321.89; 264/41, 45.1, DIG. 48, DIG. 62; 425/88, 181, 182, 317, 319, 324.1, 330, 338, 340, 445, 470

[56] References Cited

U.S. PATENT DOCUMENTS

| | | |
|---|---|---|
| 3,526,001 | 11/1968 | Smith et al. . |
| 3,528,553 | 9/1970 | Caracciolo . |
| 3,884,814 | 5/1975 | Vogt et al. . |
| 3,957,648 | 5/1976 | Roget et al. . |
| 4,146,597 | 3/1979 | Eckstein et al. . |
| 4,531,954 | 7/1985 | Klein . |
| 4,668,401 | 5/1987 | Okumura et al. . |

FOREIGN PATENT DOCUMENTS

| | | |
|---|---|---|
| 1140533 | 2/1983 | Canada . |
| 0206130 | 12/1986 | European Pat. Off. . |
| 1959394 | 7/1970 | Fed. Rep. of Germany . |
| 2338070 | 2/1974 | Fed. Rep. of Germany . |
| 2539574 | 5/1980 | Fed. Rep. of Germany . |
| 2700966 | 6/1982 | Fed. Rep. of Germany . |
| 2214502 | 8/1974 | France . |
| 2451952 | 10/1980 | France . |
| 2135902 | 9/1984 | United Kingdom . |
| 8706151 | 10/1987 | World Int. Prop. O. . |

*Primary Examiner*—Frank Sever
*Attorney, Agent, or Firm*—Oliff & Berridge

[57] ABSTRACT

A hollow fiber module with at least one bundle of hollow fibers made in a U shape, in which each hollow fiber bundle comprises at least two part bundles of different average lengths, the hollow fibers arranged essentially in the form of layers at least in the region of the bend of the U shape, the layers extending substantially parallel to the longitudinal axis of the module, the longitudinal axes of the layers and the longitudinal axis of the module approximately coinciding and the layers forming an angle between them when viewed longitudinally. An apparatus and process for making the hollow fiber module are also disclosed.

3 Claims, 7 Drawing Sheets

Fig. 7

HOLLOW FIBER MODULE

This is a division of application Ser. No. 07/353,068, filed May 12, 1989.

FIELD OF THE INVENTION

The invention relates to a hollow fiber module with at least one bundle of hollow fibers made in a U shape, in which the two end regions of each of the hollow fibers are embedded in a sealing compound body and the exits of the hollow fibers open at their two ends are located on the outer end face of the sealing compound body. More specifically, it relates to a hollow fiber module adapted for gas, vapor or liquid suspension filtration, cross flow filtration, gas separation, isolation of gas from a liquid, mass transfer, or heat exchange.

BACKGROUND OF THE INVENTION

Hollow fiber modules with hollow fibers made in a U shape—also called hairpin-shaped—are known in the art, for example as so-called dead-end filter candles, the microporous wall of the hollow fibers functioning as the actual filter agent.

Hollow fibers with a thin wall or with semipermeable or selective properties are as a rule also described as hollow fiber membranes, membranes in hollow fiber form, as capillary membranes in the case of small diameters and in similar terms. Such membranes having the last mentioned properties are also described as nonporous or dense membranes.

In hollow fibers, the separation (filtering) can take place from the outside inwards, that is to say into the interior (lumen) of the hollow fibers, but also in the converse direction. All dead-end separation devices (filters) of this type here have the common feature that the filtrate or permeate can be continuously discharged until the filter agent is exhausted, while the part or parts of the starting medium (non-filtrate), which has or have been separated off (filtered off), remain(s) in the outer space surrounding the hollow fibers or in the hollow fibers, and is or are sometimes deposited on the filter surface and sometimes form(s) a filter layer (filter cake) and is or are not likewise discharged continuously as, for example, in cross-flow filtration. This is the reason for the name dead-end.

It has proved to be a disadvantage in the known hollow fiber modules with hollow fibers made in a U shape that the hollow fiber bundle takes up a substantially greater volume in the region of the substantially semicircular bend of the hollow fibers than in the region of the embedding of the end regions of the hollow fibers. Depending on the number of hollow fibers, such hollow fiber bundles therefore have a very pronounced pear shape. This has the consequence that the housing in which such a hollow fiber module is to be installed must have substantially greater dimensions, and in the case of a round crossection also a substantially greater diameter than the dimensions (the diameter) of the sealing compound body would require. This means that the space requirement of the known hollow fiber modules with hollow fibers made in a U shape is relatively large, which amounts to a not inconsiderable part of the costs in large-scale plants with a multiplicity of such hollow fiber modules.

SUMMARY OF THE INVENTION

It is therefore the object underlying the present invention to provide a hollow fiber module of the generic type with a substantially smaller space requirement, with the surface area remaining the same.

This object is achieved, according to the invention, by a hollow fiber module of the type described at the outset, wherein each hollow fiber bundle comprises of at least two part bundles, the part bundles having different average lengths, the hollow fibers being arranged essentially in the form of layers at least in the region of the substantially semicircular bend These regions of at least two part bundles are located in another layer, the layers extending substantially parallel to the longitudinal axis of the module, the longitudinal axes of the layers and the longitudinal axis of the module approximately coinciding and—as viewed in the longitudinal direction—the layers forming an angle between them.

The part bundles can contain hollow fibers of equal length within one part bundle, so that the part bundles then have different lengths. However, the part bundles can also contain hollow fibers of different lengths, so that they nevertheless then contain different average lengths. Thus, it is readily possible here that individual hollow fibers of different part bundles have the same lengths, but that is to say the average, the mean, length of all the hollow fibers of one bundle is in every case greater or smaller than the mean (average) length of another part bundle.

Because the part bundles are, in a manner of speaking, in an intertwined arrangement, less space (volume) is required for the region in which the hollow fibers are bent in a substantially semicircular manner.

The module is produced in such a way that initially one or more hollow fiber bundles is or are produced by successively arranging part bundles. The end regions of the hollow fibers are then embedded (welded or cast) in a curable sealing compound and, after curing of the sealing compound, material is then removed from the outer end face of the sealing compound body formed in this way until the open hollow fibers are exposed. Before embedding, the hollow fibers can still or already be (have been) filled with a liquid, and a solid or active substance or medium.

For the purpose of easier processing, the hollow fibers of the part bundles can preferably be held together, for example, by previously adhesively bonding or welding the hollow fiber ends to one another or tying them together by means of a string.

The precise way of producing a hollow fiber bundle for the hollow fiber module according to the invention is described below in the detailed description of the preferred embodiment with reference to the Figures.

In the hollow fiber module according to the invention, it is also possible for a plurality of hollow fiber bundles to be held by a common sealing compound body, each of which bundles includes, according to the invention, at least two part bundles.

By means of the hollow fiber module according to the invention, for example, so-called bag filters can be replaced, several of which are frequently arranged on a common base. The hollow fiber module according to the invention furthermore has the advantage that it has a substantially greater filter area per volume than the bag filters.

The hollow fiber bundle can be surrounded, i.e. enclosed, by a fabric enveloper or nonwoven envelope, or sheath, which acts as a pre-filter when the flow through the hollow fibers is from the outside inwards. The sheath can be woven, knitted or made of a fibrous fleece material. Moreover, the hollow fiber bundle can, alternatively or additionally, be surrounded by a grid-like guard shield or perforated protective jacket for protection from mechanical damage.

The part bundles can also have been formed from hollow fiber tapes or hollow fiber mats, which were produced by a weaving or knitting process and then rolled up to form the part bundles, before they are assembled to give a hollow fiber bundle for the module according to the invention.

With advantage, however, the hollow fiber module can also be designed and used as a cross-flow (micro) filter or as a mass exchanger and/or heat exchanger. For this purpose, one of the open ends of each of the hollow fibers must be spatially separated from the other open ends thereof so that flow through the hollow fibers is possible and the medium in the form of gas, vapor or liquid, which enters the hollow fibers, can be kept separate from that emerging from the hollow fibers. This is achieved, for example, by means of a partition which is provided on the outer end face of the sealing compound body and which, for example in interaction with a housing surrounding the module, subdivides the space adjoining the end face into a feed and distribution chamber and a collecting and discharge chamber.

A hollow fiber module of such a design is suitable in the use of corresponding hollow fibers for gas separation or for separating gas from liquids, which gas is in the form of gas bubbles or also in a dissolved form or chemically bound form. For separating gas components from a gas mixture, so-called non-porous membranes are used here, but for separating gas bubbles from a liquid, porous to microporous membranes are as a rule used. For the removal of dissolved or chemically bound gases from liquids, both porous and non-porous membranes can be used.

It is also possible to fill the hollow fibers of the module with a substance in the form of a solid, liquid, vapor and/or gas, then to seal the hollow fibers and to subject the hollow fiber module brought into this form then to mass transfer and/or heat transfer.

The hollow fiber module preferably is designed as an exchangeable or replaceable filter candle which can be releasably installed in a housing or an open container and, when the performance drops or after exhaustion, can be discarded, cleaned or regenerated in some other way.

In the region of the longitudinal axis of the module, the hollow fiber bundle can have a so-called core or, if appropriate, a perforated core tube, but it can also be coreless.

In a usual filter candle, the number of the hollow fibers per bundle can be 2,000 to 2,500, but it can also be substantially more or less. A usual degree of filling (packing density) is here in the region from 50 to 60%. A suitable hollow fiber diameter is, for example, 0.6 mm on the inside and 1 mm on the outside. In an example, the length of the filter candle was about 215 mm (about 10 inches) and the diameter was about 65 mm.

The invention will now be described in more detail with reference to the appended drawings.

BRIEF DESCRIPTION OF DRAWINGS

In the figures, the same parts are provided with the same item numbers. For this reason, not every part is mentioned in every figure, if it has already been mentioned before.

DETAILED DESCRIPTION OF THE PREFERRED EMBODIMENTS

Figure 1:
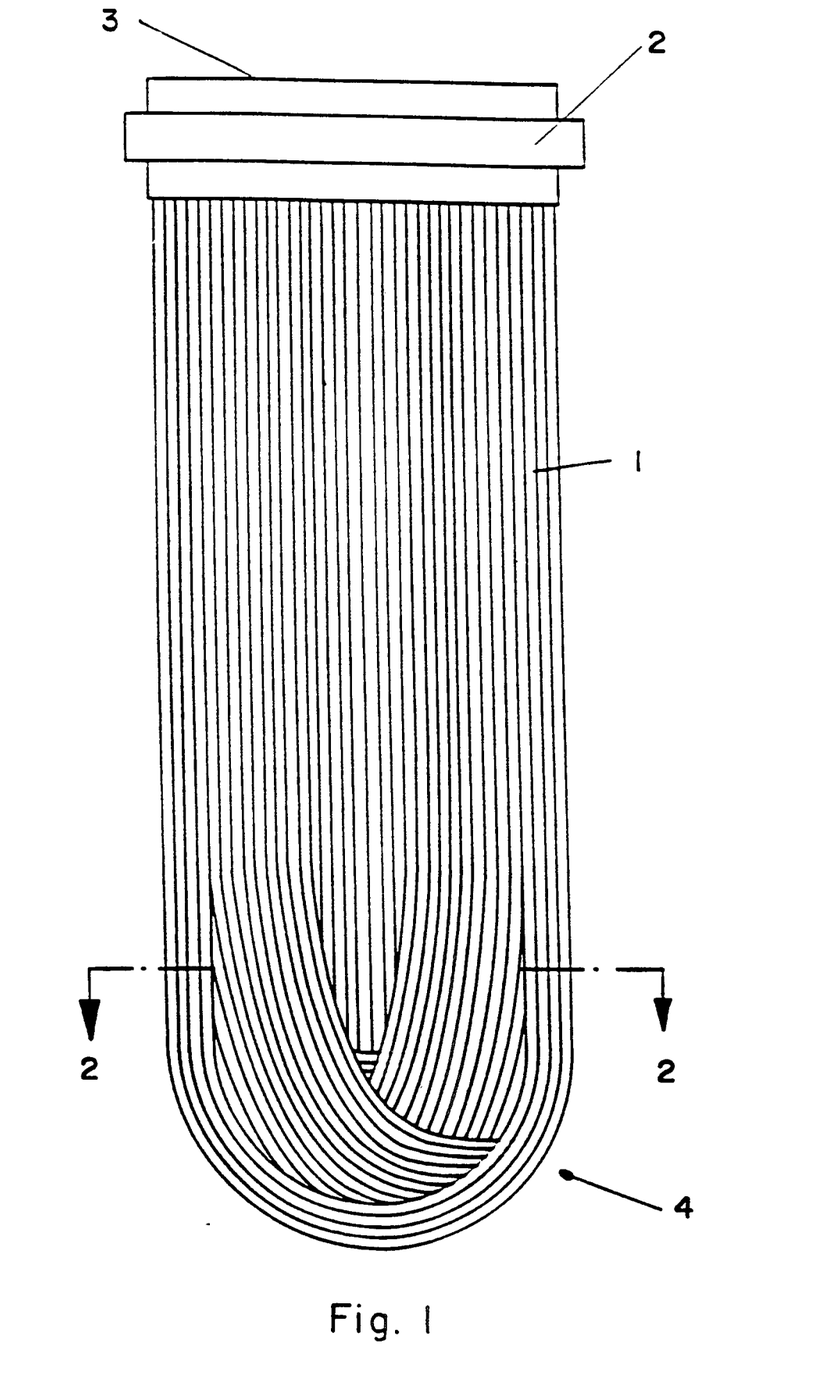
FIG. 1 shows a hollow fiber module in side view.

The hollow fiber module shown in FIG. 1 includes the hollow fibers 1 which are made in a U shape (hairpin-shaped), the two end regions of which are embedded in the sealing compound body 2 made in the form of a flange. The exits of the hollow fibers 1 open at their two ends are located on the outer end face 3 of the sealing compound body 2. In the region 4, where the hollow fibers 1 are bent substantially in a semicircle, individual part bundles can be seen. It can also be clearly seen that the hollow fibers 1 belonging to different part bundles cross each other in this region 4 and form a crossing angle.

Figure 2:
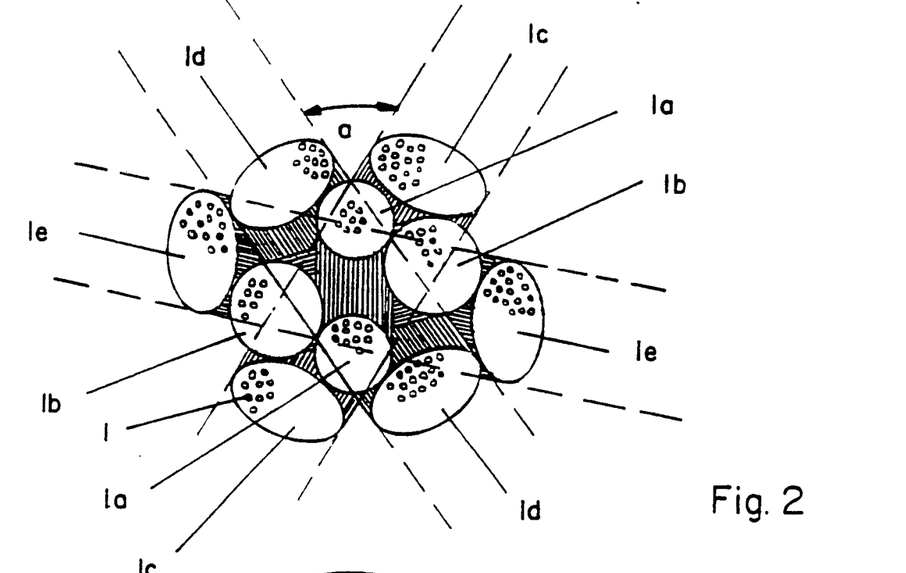
FIG. 2 shows a section through the hollow fiber bundle in FIG. 1.

FIG. 2 shows the hollow fiber bundle according to FIG. 1 in a cross-section along the line —2 in FIG. 1. The illustration shows that the hollow fiber bundle consists of five part bundles 1a; 1b; 1c; 1d and 1e in total. The dashed lines indicate two layers in which the regions 4 are located in which the hollow fibers 1 are bent subststantially in a semicircle. The illustration shows that the layers form an angle a with one another. It would also be possible to say that—as viewed in the longitudinal direction of the hollow fiber module—the individual part bundles are, at least in the region of the semicircular bend of the hollow fibers, each arranged with a twist by the angle a.

Figure 3:
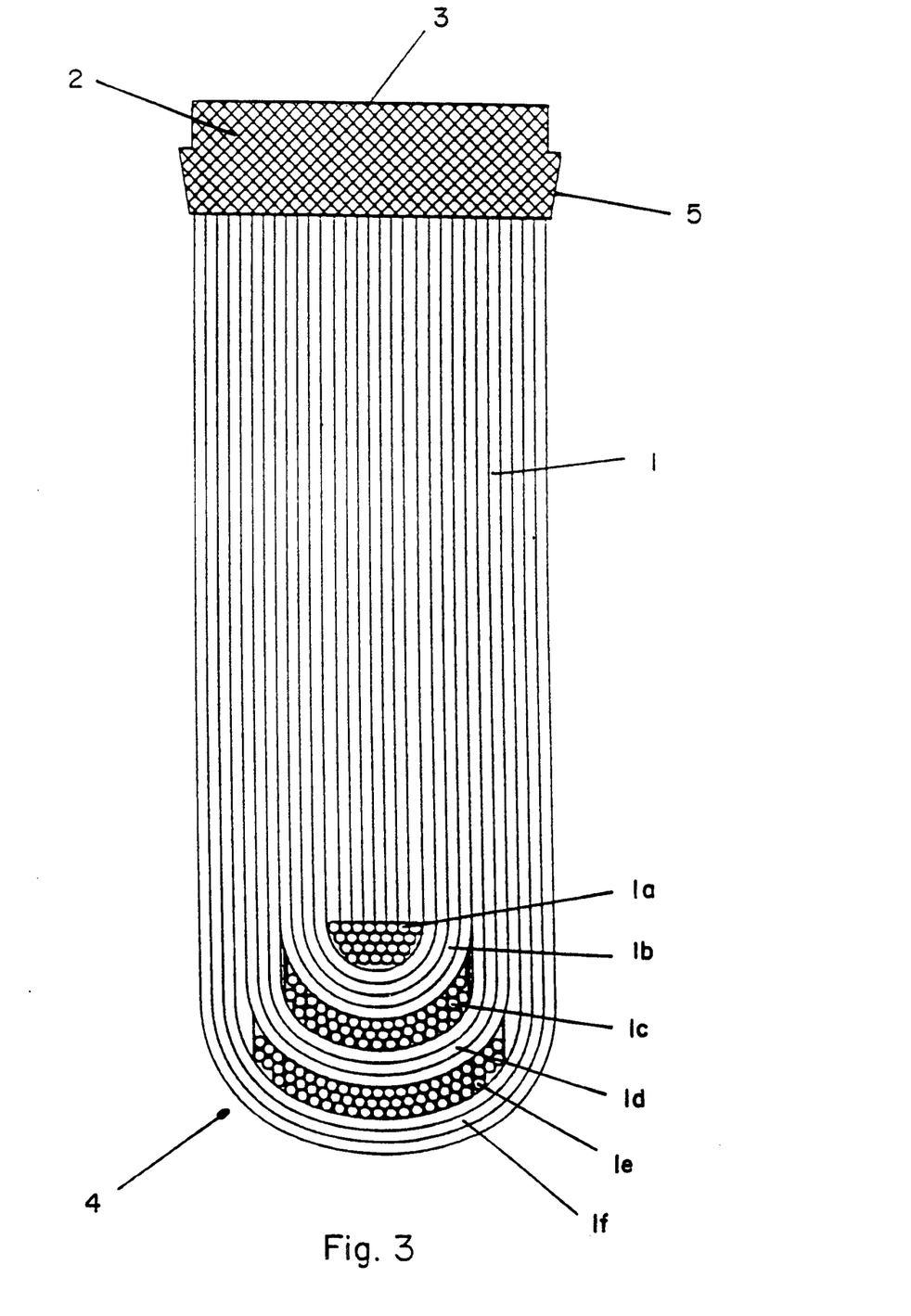
FIG. 3 shows another embodiment of the hollow fiber module in longitudinal section.

FIG. 3 shows a hollow fiber module in which the hollow fiber bundle comprises six part bundles 1a to 1f in total. The layers, in which the semicircularly bent regions 4 of the hollow fibers 1 are arranged, here form an angle of substantially 90° with one another. The sealing compound body 2 is here provided with a sealing surface 5 of conical shape.

Figure 4:
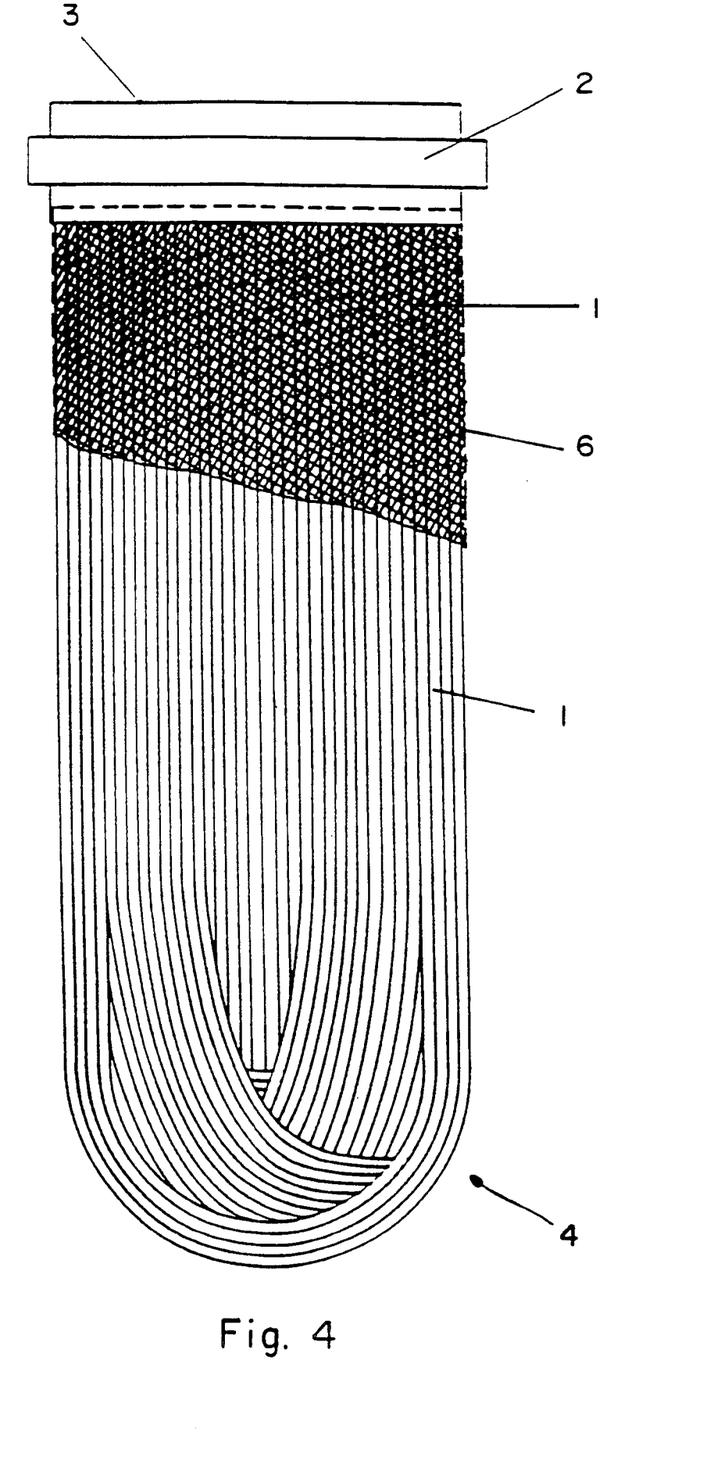
FIG. 4 shows a hollow fiber module with an envelope.

The hollow fiber module shown in FIG. 4 corresponds to that shown in FIG. 1, the hollow fiber bundle here being enclosed by an envelope or sheath which can include woven fabric, knitted fabric, nonwoven material, fibrous fleece or the like. However, only a part of this envelope 6 is shown.

Figure 5:
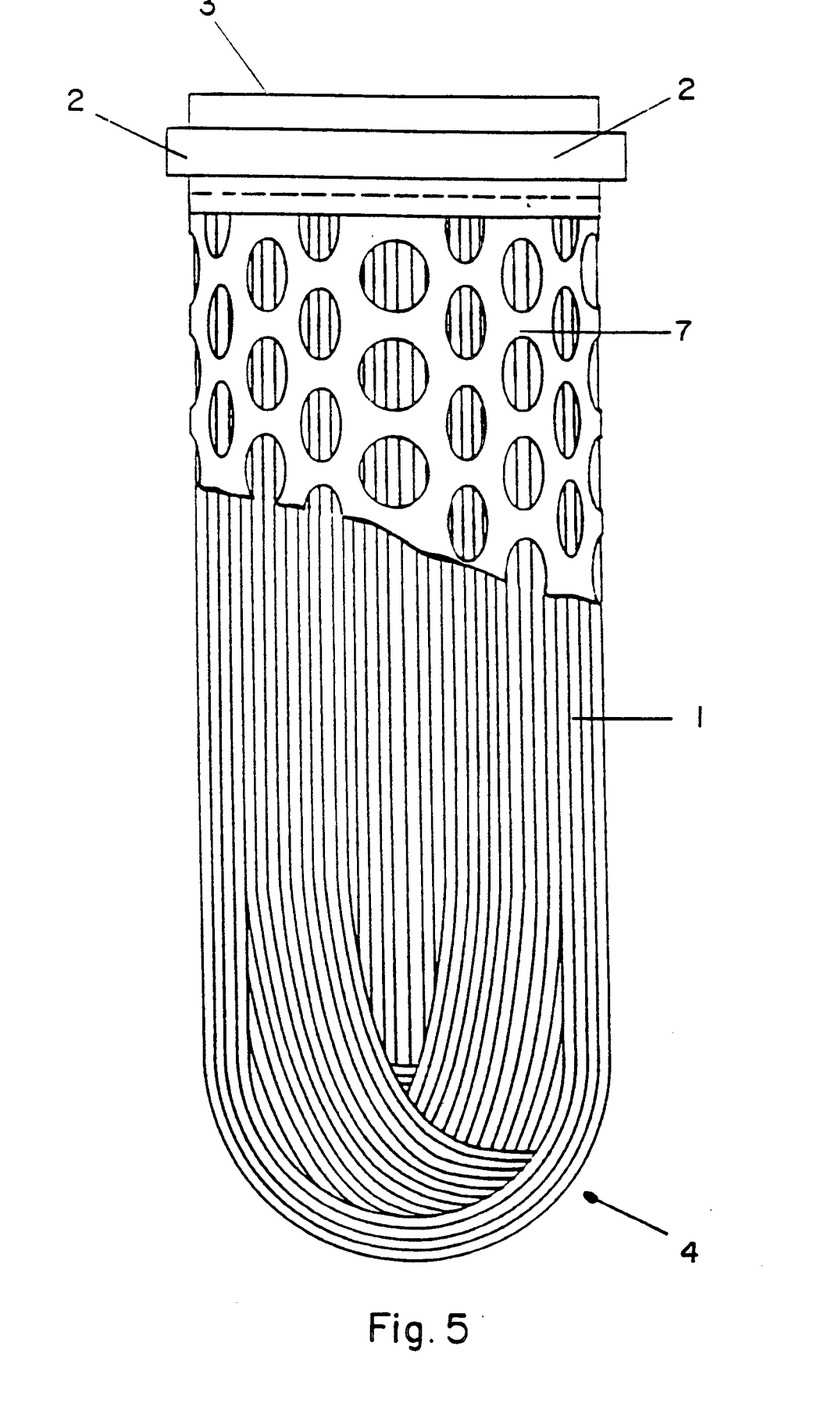
FIG. 5 shows a hollow module with a guard shield.

FIG. 5 shows a hollow fiber module which corresponds to that shown in FIG. 1, the hollow fiber bundle here being surrounded by a perforated guard shield or protective jacket 7 for protecting the hollow fibers 1 from mechanical damage. Only part of the guard shield 7 is shown.

Figure 6:
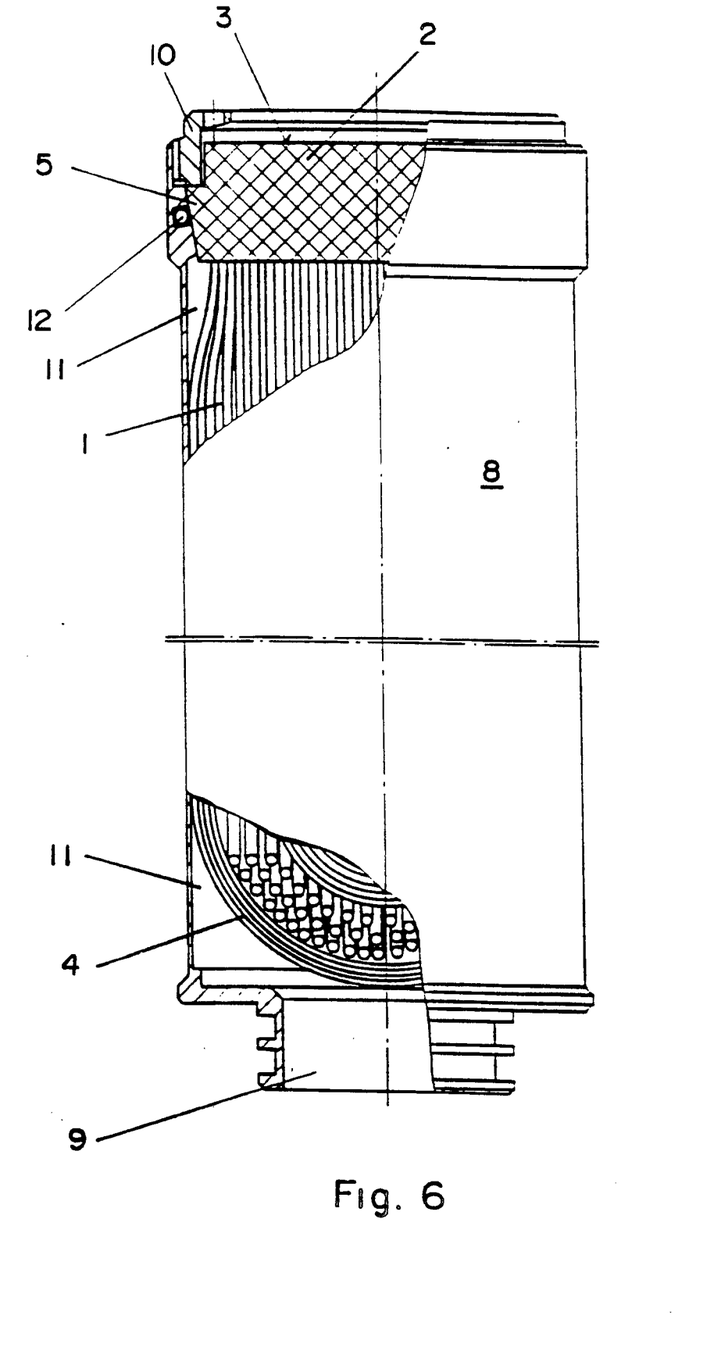
FIG. 6 shows a hollow fiber module installed in a housing.

FIG. 6 shows—in a partially sectional manner of illustration—a hollow fiber module which substantially corresponds to that shown in FIG. 3 and which is releasably installed in a housing 8. A connection adaptor 9 is located on the side of the housing 8 which is at the bottom in the illustration. It would be equally possible to provide a flange or another connecting element at this point. In the upper housing part, the hollow fiber module is fixed by means of the ring nut 10. Sealing of the chamber 11 surrounding the hollow fibers 1 is effected by means of the 0-ring seal 12 which is forced against the conical sealing surface 5 of the sealing compound body 2.

Figure 7:
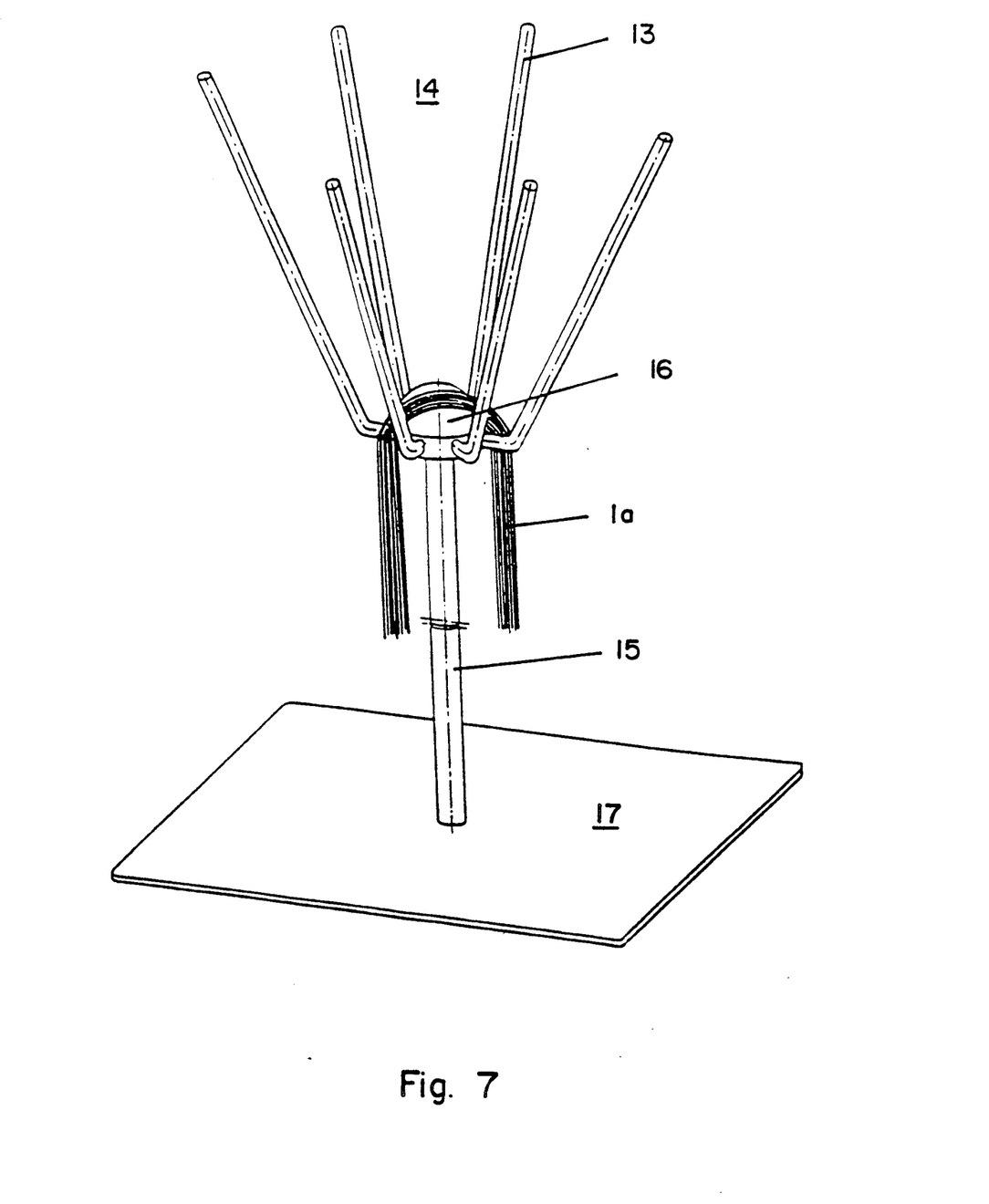
FIG. 7 shows a device for producing a hollow fiber bundle for the hollow fiber module.

The device shown in FIG. 7 for producing a hollow fiber bundle from part bundles for the hollow fiber module consists of the base plate 17, a bar 15 which is fixed at its lower end perpendicularly to the base plate 17 and to the upper end of bar 15 the hemispherical cap 16 is fixed, and of the six rods 13 which point upwards like spiders' legs in uniform distribution around cap 16. This device enables a hollow fiber bundle to be produced in which the layers, which are formed by the semicircularly bent sections of the hollow fibers, form an angle of 60° with one another. Any desired number of part bundles can here be, in a manner of speaking, stacked above one another. The semicircular bend in the middle of the hollow fibers is supported by the cap 16.

The production of a hollow fiber bundle from part bundles is carried out in the following way: a first part bundle 1a is inserted through the first and fourth gap 14 between the rods 13 in such a way that the middle of the hollow fibers rests in the upper region of the cap 16 and the unbent sections of the hollow fibers hang down freely. A second part bundle (not shown), the hollow fibers of which can now already have a greater average length, is then laid in the same way on top of the first part bundle 1a, but through the second and fifth gap 14. A third part bundle (likewise not shown), to which otherwise the comments given for the second part bundle apply, is laid on top of the second part bundle, but through the third and sixth gap 14. A fourth part bundle can then be laid again through the first and fourth gap 14 on top of the third part bundle, etc., until a hollow fiber bundle having the desired number of hollow fibers has been formed. In the illustration shown, this can then be pulled out upwards, for which purpose the rods 13 can first have been removed, to make it easier. Subsequently, the embedding of the end regions of the hollow fibers, in the manner described above and known per se, and the further processing to give the hollow fiber module according to the invention take place.

Figure 8:
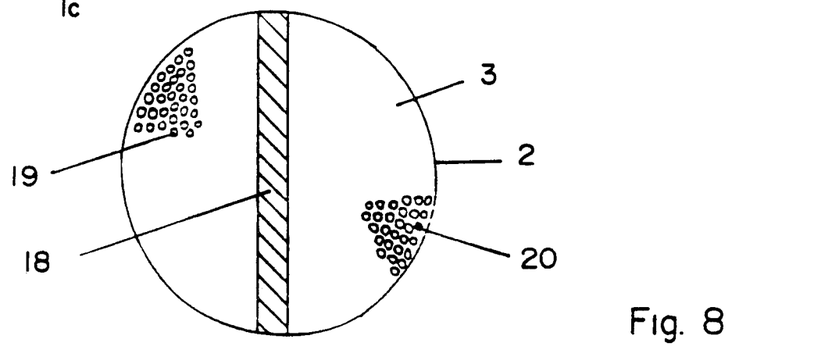
FIG. 8 shows the end face of a hollow fiber module with a partition in plan view.

FIG. 8 shows a plan view of the outer end face 3 of the sealing compound body 2 of a hollow fiber module, in the case of which one of the open ends 19 of each of the hollow fibers is spatially separated from the other open ends 20 thereof by the partition (in section) 18, so that flow through the hollow fibers from the open ends 19 to the open ends 20 or vice versa is possible. In interaction with a housing, which is not shown and surrounds the module, this partition 18 subdivides the space, which adjoins the outer end face 3 and which is bounded by the housing which is bounded by the housing which is not shown, into a feed and distribution chamber and a collecting and discharge chamber.

Figure 9:
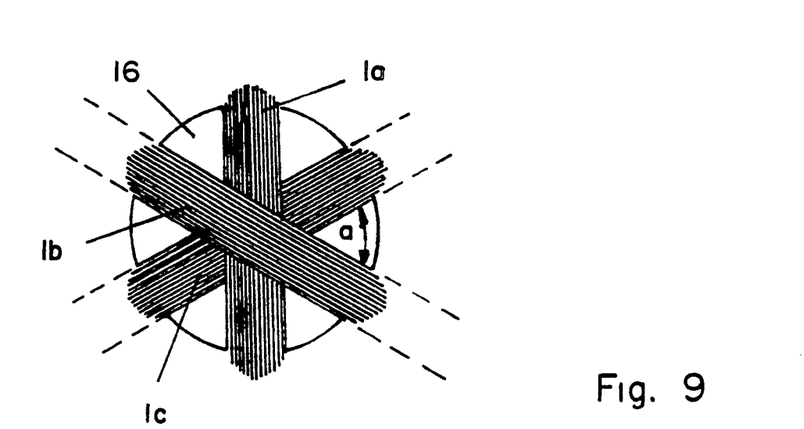
FIG. 9 shows the hollow fiber bundle end in the region of the bend in plan view.

In FIG. 9, the end of a hollow fiber bundle in the region of the substantially semicircular bend of the hollow fibers is shown in plan view, the hollow fiber bundle comprising three part bundles 1a, 1b and 1c, as resulting, for example, when the device shown in FIG. 7 is used. It will again be seen very clearly that the layers (dashed lines), in which the bent regions of the hollow fibers are arranged or, expressed in other words, the layers which are formed by these regions, for an angle of 60° with one another.

It is to be understood that the invention is not limited to the embodiments described and that other modifications may be made without departing from the spirit and scope of the invention. Thus, the scope of the invention is to be limited only the appended claims.

What is claimed is:

1. A process comprising making a hollow fiber module having a shape alternative to a very pronounced pear-shape, the process comprising:
    successively arranging said hollow fibers into part bundles of fibers;
    embedding the ends of said part bundles of fibers into a curable sealing compound;
    allowing said curable sealing compound to solidify; and
    removing a sufficient amount of said curable sealing compound such that said ends of said hollow fibers of said part bundles of fibers are exposed.

2. The process of claim 1 wherein said hollow fibers are successively arranged into part bundles of fibers by:
    arranging said hollow fibers of a first part bundle of fibers in a U-shaped form, said ends of said hollow fibers being directed downward; and
    successively arranging at least one other part bundle of fibers in a U-shaped form such that each of said other part bundles of fibers successively arranged is above the part bundles previously arranged and such that each of said other part bundles of fibers is twisted around a common longitudinal axis of said part bundles of fibers.

3. An apparatus comprising means for making a hollow fiber module having a shape alternative to a very pronounced pear-shape, said means comprising:
    a bottom plate;
    a bar having an upper end and a lower end, said lower end being connected perpendicularly to said bottom plate;
    a hemispherical cap affixed to said upper end of said bar; and
    at least six upwardly projecting rods uniformly distributed on said hemispherical cap.

* * * * *

UNITED STATES PATENT AND TRADEMARK OFFICE
CERTIFICATE OF CORRECTION

PATENT NO. : 5,160,673
DATED : November 3, 1992
INVENTOR(S) : Rudi WOLLBECK et al It is certified that error appears in the above-identified patent and that said Letters Patent is hereby corrected as shown below:

Col. 1,   line 5, change "12" to --17--.

Col. 4,   line 36, change "--2" to --2-2--;

line 41, change "subststantially" to --substantially--;

line 42, change "a" to --α--;

line 47, change "a." to --α.--.

Signed and Sealed this

Nineteenth Day of October, 1993

*Attest:*

BRUCE LEHMAN

*Attesting Officer*  *Commissioner of Patents and Trademarks*